United States Patent
Lynch et al.

(10) Patent No.: US 11,871,102 B2
(45) Date of Patent: Jan. 9, 2024

(54) METHOD AND SYSTEM FOR MANAGING A RECORDING DEVICE

(71) Applicant: LensLock, Inc., Poway, CA (US)

(72) Inventors: Jeremy Lynch, San Diego, CA (US);
Jack Madrid, San Diego, CA (US);
Patrick Felsted, San Diego, CA (US);
Benjamin Christian Boynton, San Diego, CA (US)

(73) Assignee: LensLock, Inc., Poway, CA (US)

( * ) Notice: Subject to any disclaimer, the term of this patent is extended or adjusted under 35 U.S.C. 154(b) by 123 days.

(21) Appl. No.: 17/110,731

(22) Filed: Dec. 3, 2020

(65) Prior Publication Data

US 2021/0176393 A1 Jun. 10, 2021

Related U.S. Application Data

(60) Provisional application No. 62/943,346, filed on Dec. 4, 2019.

(51) Int. Cl.
| | |
|---|---|
| *H04W 48/16* | (2009.01) |
| *H04W 4/38* | (2018.01) |
| *H04W 4/80* | (2018.01) |
| *H04N 7/18* | (2006.01) |
| *H04N 23/661* | (2023.01) |
| *H04N 23/61* | (2023.01) |

(52) U.S. Cl.
CPC .............. *H04N 23/61* (2023.01); *H04N 7/181* (2013.01); *H04N 23/661* (2023.01); *H04W 4/38* (2018.02); *H04W 4/80* (2018.02); *H04W 48/16* (2013.01)

(58) Field of Classification Search
CPC .. H04N 5/23218; H04N 5/23206; H04N 5/77; H04N 5/23209; H04N 7/181; H04N 7/18; H04N 23/61; H04N 23/663; H04N 23/661; H04W 4/38; H04W 4/80; H04W 48/16; H04W 48/20; H04W 88/06
See application file for complete search history.

(56) References Cited

U.S. PATENT DOCUMENTS

| | | | |
|---|---|---|---|
| 6,665,004 B1 * | 12/2003 | Paff ................. | G08B 13/19689 348/156 |
| 9,253,452 B2 | 2/2016 | Ross et al. | |
| 2016/0360088 A1 * | 12/2016 | Tanabiki ................ | B60R 11/04 |
| 2018/0006746 A1 * | 1/2018 | Yasuzaki ............ | H04N 1/32117 |
| 2018/0053408 A1 * | 2/2018 | Siminoff ................. | G06T 7/20 |
| 2018/0063421 A1 * | 3/2018 | Yokomitsu ......... | H04N 5/23206 |
| 2019/0253857 A1 * | 8/2019 | Li ........................... | H04W 4/80 |
| 2022/0012496 A1 * | 1/2022 | Hagio ..................... | H04Q 9/00 |

* cited by examiner

*Primary Examiner* — Lin Ye
*Assistant Examiner* — Chriss S Yoder, III
(74) *Attorney, Agent, or Firm* — Troutman Pepper Hamilton Sanders LLP

(57) ABSTRACT

A device, system, and method of automatically managing a recording device is described. The device includes a sensor monitoring assembly comprising a receiver, a controller, and a transmitter. The sensor monitoring assembly can be in communication with a sensor and a recording device and automatically instruct the recording device to begin recording when the sensor is detected by the sensor monitoring assembly to be in an activated state.

19 Claims, 9 Drawing Sheets

METHOD AND SYSTEM FOR MANAGING A RECORDING DEVICE

CROSS-REFERENCE TO RELATED APPLICATIONS

This application claims priority to U.S. Provisional Patent Application No. 62/943,346 filed 4 Dec. 2019, the contents of which are incorporated herein by reference in their entirety as if set forth verbatim.

FIELD

Embodiments of the present disclosure relate to recording device managing apparatuses that include computer programs, methods, apparatus, and systems for managing a recording device.

BACKGROUND

Recording devices are commonly used to record events of interest and preserve evidence. In particular, the law enforcement field depends on recording devices to preserve evidence (e.g., cameras and audio recorders). Dash-cams, hidden cameras, and personal recording devices can be worn to obtain crucial evidence. However, managing the underlying recording device remains problematic.

For example, recording devices often use different cues to start recording or require manual operation which can result in the devices failing to record at a crucial time. Manually managing recording devices can also be problematic if an officer forgets to start recording because he or she is distracted, which is common in dangerous situations. In courts, evidence typically must be corroborated or forensically verifiable, but this can be difficult based solely on the recorded content. Finally, organizing evidence is time-consuming and creates unnecessary work for police departments.

The solution of this disclosure resolves these and other problems in the art.

SUMMARY

Accordingly, the inventors of this disclosure have recognized that there is a need for the following solution.

In some examples, a sensor monitoring assembly is disclosed for use with a recording device. The sensor monitoring assembly can include a controller and a receiver in communication with the controller and operable to receive a first communication signal from a sensor. The sensor can be configured to transmit the first communication signal in response to detecting an event of interest. The sensor monitoring assembly can also include a transmitter in communication with the controller and operable to transmit a second communication signal to a recording device to cause the recording device to begin recording data. The controller can be configured to cause the transmitter to transmit the second communication signal to the recording device in response to the receiver having received the first communication signal.

The controller can be further configured to periodically scan, with the receiver, for the first communication signal to determine presence of the sensor in an activated state within an operating range of the sensor monitoring assembly. The controller can also be configured to periodically scan, with the receiver, for a third communication signal from the recording device to determine presence of the recording device within an operating range of the sensor monitoring assembly. As an example, the controller can be further configured to periodically scan for the first communication signal at least every three seconds and the controller can be configured to periodically scan for the third communication signal at least every thirty seconds.

The controller can be further configured to, in response to determining that a connection between the recording device and the sensor monitoring assembly is interrupted, periodically transmit, with the transmitter over a predetermined time interval, a fourth communication signal to reestablish a connection between the recording device and the sensor monitoring assembly. The controller can also be configured to periodically scan, with the receiver, for a predetermined Bluetooth Low Energy (BLE) beacon associated with the recording device, and, in response to detecting a presence of the predetermined BLE beacon, link the recording device with the sensor monitoring assembly.

In some examples the sensor monitoring assembly can include a controller including at least one receiver and a transmitter, wherein the at least one receiver is operable to receive a first communication signal from at least one sensor transmitting an output signal, wherein the transmitter is operable to transmit a second communication signal to a recording device to instruct the recording device to begin recording data, wherein the transmitter transmits the second communication signal to the recording device in response to the receiver having received the first communication signal from the at least one sensor transmitting an output signal.

In some examples, the assembly comprises a beacon device configured to activate the recording device.

In some examples, at least one sensor is configured to detect an event of interest to transmit the output signal, and wherein detecting the event of interest by the at least one sensor causes the second communication signal to begin recording.

In some examples, the event of interest comprises at least one of door movement, window movement, a garage door opening, movement of a mailbox, activation of a siren, disconnection of the recording device from a connector or mount, disconnection of the recording device from an officer, turning off a vehicle, turning on the vehicle, movement of a vehicle trunk, a sudden change in movement, and a sudden change in sound.

In some examples, the assembly consists of only one recording device configured for wear by a police officer, the recording device being a body camera.

In some examples, the assembly consists of only one transmitter.

In some examples, the recording device is configured to operatively communicate with the sensor monitoring assembly within a predetermined range.

In some examples, the predetermined range is approximately 200 feet.

In some examples, the predetermined range is approximately 25 feet.

In some examples, the sensor monitoring assembly is contained in a computer with a housing, a printed circuit board (PCB) in the housing, a FT232 USB connector in communication with the PCB, a Bluetooth Low Energy (BLE) module in communication with the PCB, a wireless (WI-FI) communication module in communication with the PCB.

In some examples, the assembly includes a receiver capable of receiving Bluetooth Low Energy communication signals.

In some examples, the assembly includes a receiver capable of receiving Wi-Fi communication signals.

In some examples, the assembly includes a receiver capable of receiving communication signals through a Universal Serial Bus connection.

In some examples, the assembly includes a transmitter capable of transmitting Blue Tooth Low Energy communication signals.

In some examples, the assembly includes a transmitter capable of transmitting Wi-Fi communication signals.

In some examples, the assembly includes a recording device which is a camera worn by an individual.

In some examples, the assembly includes a recording device which is a camera mounted on a vehicle.

In some examples, the assembly includes a recording device which is a camera mounted to monitor a premises.

In some examples, the assembly includes a recording device which is an internet service with a receiving application programming interface.

In some examples, the sensor monitoring assembly is operable to scan for the first communication signal at least every three seconds.

In some examples, the sensor monitoring assembly is operable to scan at least every thirty seconds for a third communication signal being transmitted by the recording device to ensure the recording device is in communication with the sensor monitoring assembly.

In some examples, the sensor monitoring assembly communicates only with a device having a predetermined service set identifier.

In some examples, the sensor monitoring assembly is operable to communicate with more than one recording device at a time.

In some examples, the sensor monitoring assembly is operable to maintain a log of events.

In some examples, the sensor monitoring assembly comprises a laptop computer.

In some examples, the sensor monitoring assembly comprises a printed circuit board housed within an enclosure.

In some examples, a system is disclosed consisting of a sensor assembly according to any preceding example; and a recording device, wherein the sensor assembly transmits a beacon signal at least every thirty seconds to ensure the recording device is in communication with the sensor monitoring assembly.

The disclosed technology can also include a method of automatically managing a recording device to record data. The method can include scanning, by a sensor monitoring assembly, for a first communication signal to determine presence of a recording device within an operating range of the sensor monitoring assembly; scanning, by a sensor monitoring assembly, for a second communication signal to determine presence of a sensor in an activated state within an operating range of the sensor monitoring assembly; and transmitting, by a sensor monitoring assembly, a third communication signal to instruct the recording device to begin recording data. The sensor monitoring assembly can automatically transmit the third communication signal in response to having received a second communication signal from at least one sensor.

The method can also include repeatedly scanning for the first communication signal periodically over a time interval until the presence of the recording device is detected. The time interval can be approximately 30 seconds.

The method can also include, if a connection is disrupted between the recording device and the sensor monitoring assembly, repeatedly transmitting over a second time interval, a third communication signal to reestablish a connection between the recording device and the sensor monitoring assembly. The second time interval can be approximately 3 seconds. Scanning, by the sensor monitoring assembly, for the second communication signal can include repeatedly scanning for the second communication signal periodically over a time interval (e.g., approximately 3 seconds) until the presence of a sensor in an activated state is detected.

The automatically transmitting, by the sensor monitoring assembly, the third communication signal in response to having received a second communication signal from at least one sensor can include detecting, by the at least one sensor, an event of interest, and recording data, by the recording device, in response to detecting the event of interest. The event of interest can be at least one of door movement, window movement, a garage door opening, movement of a mailbox, activation of a siren, disconnection of the recording device from a connector or mount, disconnection of the recording device from an officer, turning off a vehicle, turning on the vehicle, movement of a vehicle trunk, a sudden change in movement, and a sudden change in sound. The event of interest can also be a vehicle door or trunk has moved, the recording device disconnecting from a charger or a mount, a vehicle siren being activated, a sudden movement, and/or a noise exceeding a predetermined decibel level.

The method can further include determining presence of the recording device by monitoring for predetermined Bluetooth Low Energy (BLE) beacons associated with the recording device and, upon detection of the predetermined BLE, linking the recording device with the sensor monitoring assembly. The method can also include transmitting an output notification indicating one or more sensors of the sensor monitoring assembly have been activated.

The method can determine presence of the recording device by monitoring for predetermined voltage activity associated with the recording device transmitting voltage output signals and, upon detection of the predetermined voltage activity, linking the recording device with the sensor monitoring assembly. The method can also include transmitting an output notification indicating one or more sensors of the sensor monitoring assembly have been activated.

The method can also include activating the recording device, upon receipt of the first communication signal, and registering an identifier of the recording device into a local sensor database file.

The at least one sensor can be configured to detect door movement, window movement, a garage door opening, movement of a mailbox. The first and second communication signal can be a Bluetooth Low Energy communication signal, a Wi-Fi communication signal, a signal sent via a Universal Serial Bus connection The recording device is a camera worn by an individual, a camera mounted on a vehicle, a camera mounted to monitor a premises, and/or an internet service with a receiving application programming interface.

The sensor monitoring assembly can be configured to communicate only with a device having a predetermined service set identifier or more than one recording device at a time. The sensor monitoring assembly can be operable to maintain a log of events and can be a laptop computer and/or a printed circuit board housed within an enclosure.

The present disclosure will be more fully understood from the following detailed description of embodiments thereof, taken together with the drawings.

BRIEF DESCRIPTION OF THE DRAWINGS

While the specification concludes with claims, which particularly point out and distinctly claim the subject matter described herein, it is believed the subject matter will be better understood from the following description in conjunction with the accompanying drawings, in which like numerals indicate like structural elements and features in various figures. The drawings are not necessarily to scale, emphasis instead being placed upon illustrating principles of the disclosure. The figures depict one or more implementations of the inventive devices, by way of example only, not by way of limitation.

DETAILED DESCRIPTION

The features of the presently disclosed solution may be economically molded or assembled by using one or more distinct parts and associated components which, may be assembled together for removable or integral application. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values 20% of the recited value, e.g. "about 90%" may refer to the range of values from 71% to 99%.

Figure 1:
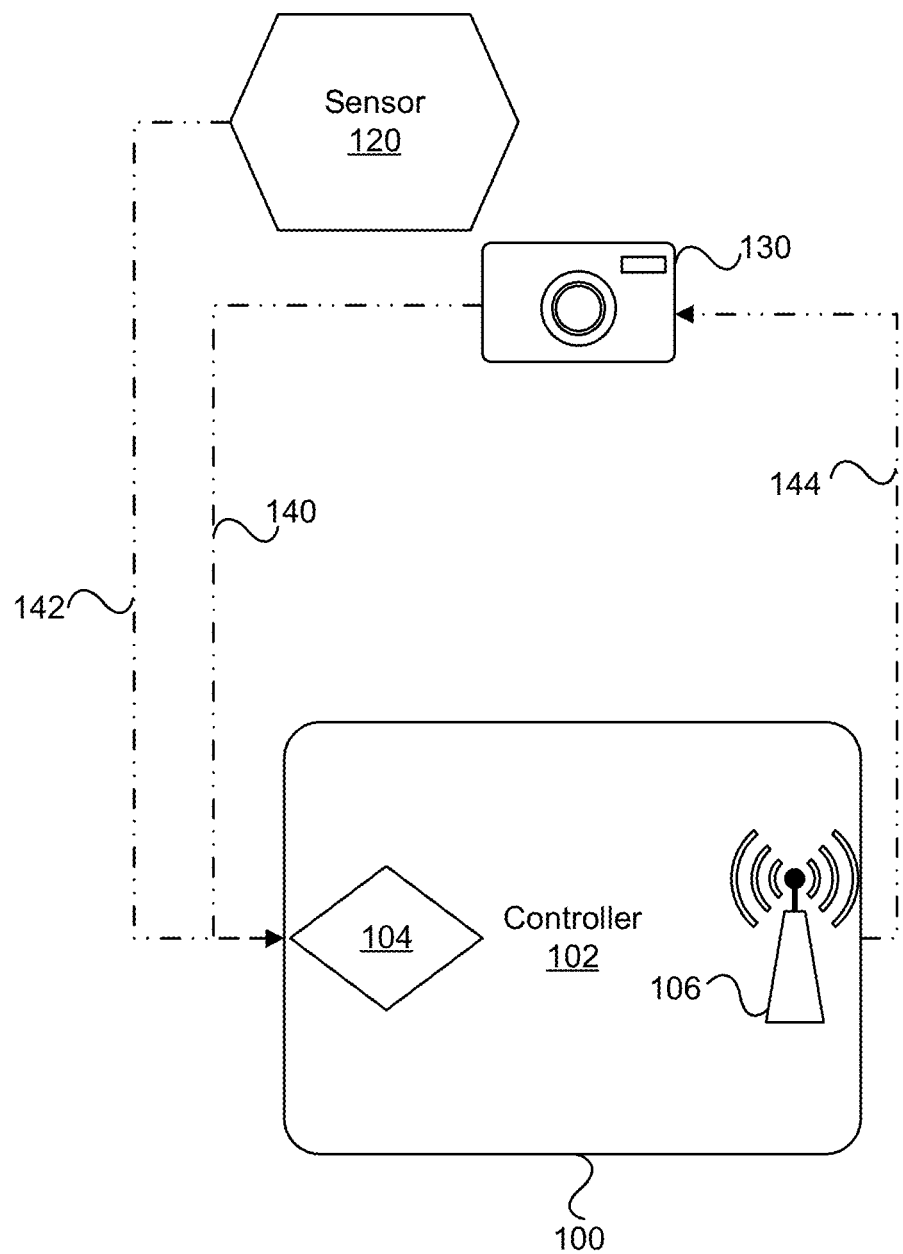
FIG. 1 is a diagram of an exemplary system with a recording device, according to an embodiment of the present disclosure.

FIG. 1 is a diagram of an exemplary system with a recording device, according to an embodiment of the present disclosure. The exemplary system can comprise a sensor 120, a sensor monitoring assembly 100, and a recording device 130. The sensor monitoring assembly can comprise a controller 102, a receiver 104, and a transmitter 106. The recording device 130 and the sensor monitoring assembly 100 can be in communication with each other via a first communication signal 140 and a third communication signal 144. The sensor 120 and the sensor monitoring assembly 100 can be in communication with each other via a second communication signal 142. The components and arrangements shown in FIG. 1 are not intended to limit the disclosed embodiments as the components used to implement the disclosed processes and features may vary.

In some examples, the sensor 120 can be any type of sensor used to detect a desired event. For example, the sensor can be configured to sense motion, capacitance, temperature, voltage, impact, or any other predetermined event. If the sensor 120 is configured to sense motion, the sensor 120 can be designated to detect a specific event, such as a garage door opening, a house door opening, a car pulling into a driveway, a mailbox being opened, window movement, or any other predetermined event. Or the sensor 120 can be configured to sense any number of events depending on where the camera is placed. For example, if the sensor 120 is intended to be carried to various locations by the user, the sensor 120 can be configured by the user to detect an event of interest specific to that location. Furthermore, the sensor 120 can be physically integrated with the recording device 130 or it can be separate and distinct from the recording device 130.

Although only one sensor 120 is shown in FIG. 1, it is contemplated that more than one sensor 120 can be connected to the sensor monitoring assembly 100 and configured to indicate when any number of events of interest have occurred. Thus, in some examples, the sensor monitoring assembly 100 can be connected to multiple sensors 120, all positioned at different locations around an area of interest, so that the recording device 130 can be instructed to begin recording when any one of the sensors 120 is activated.

The sensor 120 can be configured to be in communication with the sensor monitoring assembly 100 in various ways, including both wired and wireless type connections. For example, if the sensor 120 is in wireless communication with the sensor monitoring assembly 100, the sensor 120 can be configured to send a Bluetooth™, Bluetooth™ low-energy (BLE), Wi-Fi™, ZigBee™, infrared, radio frequency, or any other appropriate type of wireless communication for the application. In some examples of the present disclosure, the sensor 120 is a beacon device in wireless communication with the sensor monitoring assembly 100 via a BLE signal. Throughout this disclosure, the term "beacon" and "beacon device" are used interchangeably and intended to mean a wireless transmitting device which periodically transmits (transmits repeatedly with predetermined amounts of time between transmissions) a signal to communicate with another device, such as the sensor monitoring assembly or a recording device. The term "beacon device" can include a device which transmits any form of a signal such as Bluetooth™, Bluetooth™ low-energy (BLE), Wi-Fi™, ZigBee™, infrared, radio frequency, or any other appropriate type of wireless communication for the application.

Furthermore, if the sensor 120 is in wired communication with the sensor monitoring assembly 100, sensor 120 can be configured to send a signal through a USB, HDMI, Ethernet, twisted pair, coaxial, fiber optic, hard-wired, or any other appropriate form of cable for the application. For example, in some examples of the present disclosure, the sensor 120, in wired communication with the sensor monitoring assembly 100, can send a signal via a FT232 USB cable.

The sensor monitoring assembly 100 can comprise a receiver 104, a controller 102, and a transmitter 106. The various components of the sensor monitoring assembly 100 can be contained in the same housing or can be various interconnected parts not contained in the same housing. As will be appreciated, the receiver 104 and the transmitter 106 can be separate components, as depicted in FIG. 1, or can be combined into a single component such as a transceiver. Furthermore, the sensor monitoring assembly 100 can be configured to be portable or stationary, battery-operated, waterproof, dustproof, impact resistant, camouflaged, or any other modification which would be appropriate for the application.

The receiver 104 can be configured to receive wireless communication transmissions or signals sent via a wired connection. For example, the receiver 104 can be configured to receive wireless communications from the sensor 120 via Bluetooth™, Bluetooth™ low-energy (BLE), Wi-Fi™, ZigBee™, infrared, radio frequency, or any other appropriate type of wireless communication for the application. Alternatively, if the receiver 104 is configured to receive communication signals sent via a wired connection, receiver 104 can be configured to receive a signal sent via USB, HDMI, Ethernet, twisted pair, coaxial, fiber optic, a hard-wired, or any other appropriate form of cable for the application. For example, the receiver 104 can be configured to receive a signal through a FT232 USB cable from a Mobile Digital Video Recorder (MDVR) which is wired to send an output voltage when an event occurs (e.g., powering on the MDVR). Thus, a 5-volt signal sent via the FT232 USB cable would be received by the receiver 104 and used by the controller 102 to direct the recording device 130 to begin recording.

The receiver 104 can be configured to receive communication signals at various distances depending on the particular application. For example, the receiver 104 can be configured to receive a signal within an operating range of up to 200 feet. Alternatively, the receiver 104 can be configured to receive a signal up to 25 feet. The actual range can vary depending on the particular application and configuration.

The transmitter 106 can be configured to send wireless transmissions, wired transmissions, or both. For example, the transmitter 106 can be configured to send wireless transmissions via Bluetooth™, Bluetooth™ low-energy (BLE), Wi-Fi™, ZigBee™, infrared, radio frequency, or any other appropriate type of wireless communication for the application. The transmitter 106 can also be configured to transmit a signal over a wired connection such as a USB, HDMI, Ethernet, twisted pair, coaxial, fiber optic, a hard-wired, or any other form of wired connection appropriate for the application. In some examples, the transmitter 106 is configured to send communication signals via BLE. In another exemplary embodiment, the transmitter 106 is configured to send communication signals via Wi-Fi™. In yet another exemplary embodiment, the transmitter 106 can be configured to send communication signals via a FT232 USB cable. In still another embodiment, the same transmitter 106 can be configured to transmit various forms of communication signals interchangeably, including Wi-Fi™, BLE, and USB. The specific configuration of the transmitter 106 may vary depending on the particular application.

The transmitter 106 can be configured to transmit communication signals at various distances depending on the particular application. For example, the transmitter 106 can be configured to transmit a signal over several miles, one mile, 1,000 feet, 500 feet, 250 feet, 100 feet, 50 feet, 25, 10 feet or 5 feet. These ranges are given merely for illustration purposes and the actual range can vary depending on the particular application and configuration.

The controller 102 can be any form of computing device configured to receive a signal, determine a necessary action based on having received the signal, and then transmit a signal to instruct a recording device 130 to begin recording an event. For example, the sensor monitoring assembly 100 can be a laptop computer running a windows operating system which would perform the function of the controller 102. Alternatively, the controller 102 can be a printed circuit board (PCB) capable of running Python or .net Framework software. The actual configuration and function of the controller 102 may vary depending on the particular application. In some examples, the controller 102 is a laptop computer configured to detect a second communication signal 142 received by the receiver 104 from the sensor 120, make a determination based on having received the second communication signal 142, and then output to the transmitter 106 to transmit a third communication signal 144 to a recording device 130 to instruct the recording device 130 to begin recording.

In some examples, the controller 102 is configured to determine the presence of a recording device 130 by monitoring for a predetermined voltage activity associated with the recording device. Once the predetermined voltage activity has been detected by the controller 102, the controller 102 then links to the recording device 130 to ensure the recording device is in communication with the sensor monitoring assembly 100. In another example, the controller 102 is configured to detect the presence of a wireless communication signal from a recording device 130 that is a beacon device within a predetermined range. Once the controller 102 detects the presence of the beacon device's signal, the controller 102 connects with the beacon device to ensure the recording device 130 is in communication with the sensor monitoring assembly 100.

In another embodiment, the controller 102 can be configured to frequently check for communication signals from the recording device 130 and the sensor 120. For example, the controller 102 can scan for a first communication signal 140 from a recording device 130 to ensure the recording device 130 remains connected and available for recording when demanded. The scanning for the recording device 130 can be done automatically or manually by a user (e.g., depressing a button on the recording device 130 or elsewhere on the sensor monitoring assembly 100). Furthermore, automatic scanning for the recording device 130 can occur on a frequency of once every few minutes or as often as multiple times a second while the manual scanning for the recording device can occur as frequently as initiated by the user. Similarly, the controller 102 can scan for a second communication signal 142 from a sensor 120 either automatically or manually to determine if a sensor 120 has been actuated. The automatic scanning for the sensor 120 can occur on a frequency of once every few minutes or as often as multiple times a second while the manual scanning for the sensor 120 can occur as frequently as initiated by the user.

Furthermore, the scanning for either the sensor 120 or the recording device 130 can be configured to change depending on whether a sensor 120 or recording device 130 has recently been detected. For example, the controller 102 can be configured to scan for the presence of a recording device 130 once every thirty seconds so long as a recording device 130 is detected as present. However, the controller 102 can alter the frequency of scanning to scan once every three seconds if it is unable to detect the presence of a recording device 130 and continue at that frequency until a recording device 130 is detected. The foregoing examples are given only for illustration purposes and the actual configuration and function of the controller 102 will depend on the particular application.

In an example of the present disclosure, the controller 102 can be configured to scan for a first communication signal 140 at least once every thirty seconds to ensure the recording device 130 is in communication with the sensor monitoring assembly 100. The controller 102 can also be configured to scan for a second communication signal 142 at least once every 5 seconds to check if a sensor 120 has been activated. The controller 102, upon determining that the sensor 120 has been activated, can then send a third communication signal 144 to the recording device 130 to instruct the recording device 130 to begin recording.

The controller 102 can additionally be configured to scan for recording devices 130 having specific service set identifiers (SSIDs). For example, the controller 102 can be configured to scan and connect with recording devices 130 which have a specific SSID name or to connect with the first recording device 130 having a SSID beginning with certain characters. Thus, a user may have multiple recording devices 130 having SSIDs beginning with the same characters but the controller 102 only connects with the first recording device 130 which it detects having a SSID beginning with certain characters.

The controller 102 can also be configured to send, by the transmitter 106, a notification that a sensor 120 has been activated. The notification can be sent to any connected device which would provide a notice to a user. For example, the controller 102 can send, by the transmitter 106, a notification to a user's mobile phone, computer, car, or any other connected device as would be appropriate for the application to notify the user that a sensor 120 has been activated.

The sensor monitoring assembly 100 can be further configured to record a log of events as they occur. For example, the sensor monitoring assembly 100 can begin recording time stamps of when a sensor 120 was activated and when the recording device 130 was instructed to begin recording. The sensor monitoring assembly 100 can be further configured to record additional data for the log of events as is appropriate for the particular application.

The recording device 130 can be any form of recording device used to record an event. For example, the recording device 130 can be a video recorder (such as a body worn camera, a camera mounted to monitor a home, an automobile camera, etc.), a sound recorder (such as a microphone mounted in a discreet location or in a location of interest), a temperature recorder, a seismic recorder, a radiation recorder, a voltage recorder, an acceleration recorder, or any other recording device used to capture data of interest during an event. Alternatively, the recording device can be configured to be an internet service with a receiving application programming interface (API). In some examples, the recording device 130 is a camera worn by an individual, including law enforcement officers, and is configured to begin recording when it has received a signal from the sensor monitoring assembly 100 that a sensor 120 has been activated. In other examples, the recording device 130 is a camera worn by an individual, including law enforcement officers, and is configured to begin recording when it has received a signal from the sensor monitoring assembly 100 that the MDVR has been powered on or that an alarm has been detected in the vehicle.

The recording device 130 can also be activated when an event has occurred that would indicate the recording device 130 should begin recording. Such activation triggering events can include disconnecting the recording device 130 from the charger, disconnecting the recording device 130 from a mount in a vehicle, disconnecting the recording device 130 from a responding officer, opening or closing a car door, opening or closing a trunk, turning on the vehicle siren, turning off the vehicle, placing the recording device 130 into a designated mount, a sudden change in movement as detected from one or more sensors (e.g., motion activated), a loud noise such as a notice exceeding a predetermined decibel level (e.g., noise activated), or any other event which would be indicate to the recording device 130 that it should begin recording. Particularly, the foregoing examples would be relevant to a law enforcement officer so that he or she does not need to remember to turn on the recording device prior to responding to an event because the recording device 130 will automatically activate.

The actual configuration of the sensor monitoring assembly 100 can vary depending on the particular application. For example, the sensor monitoring assembly 100 can comprise a controller 102 which is a printed circuit board, a receiver 104 which is configured to receive communication signals from sensors 120 over a FT232 USB connector, and two separate wireless communication receivers 104 and transmitters 106 configured to receive and send BLE or Wi-Fi™ communication signals respectively.

Figure 2:
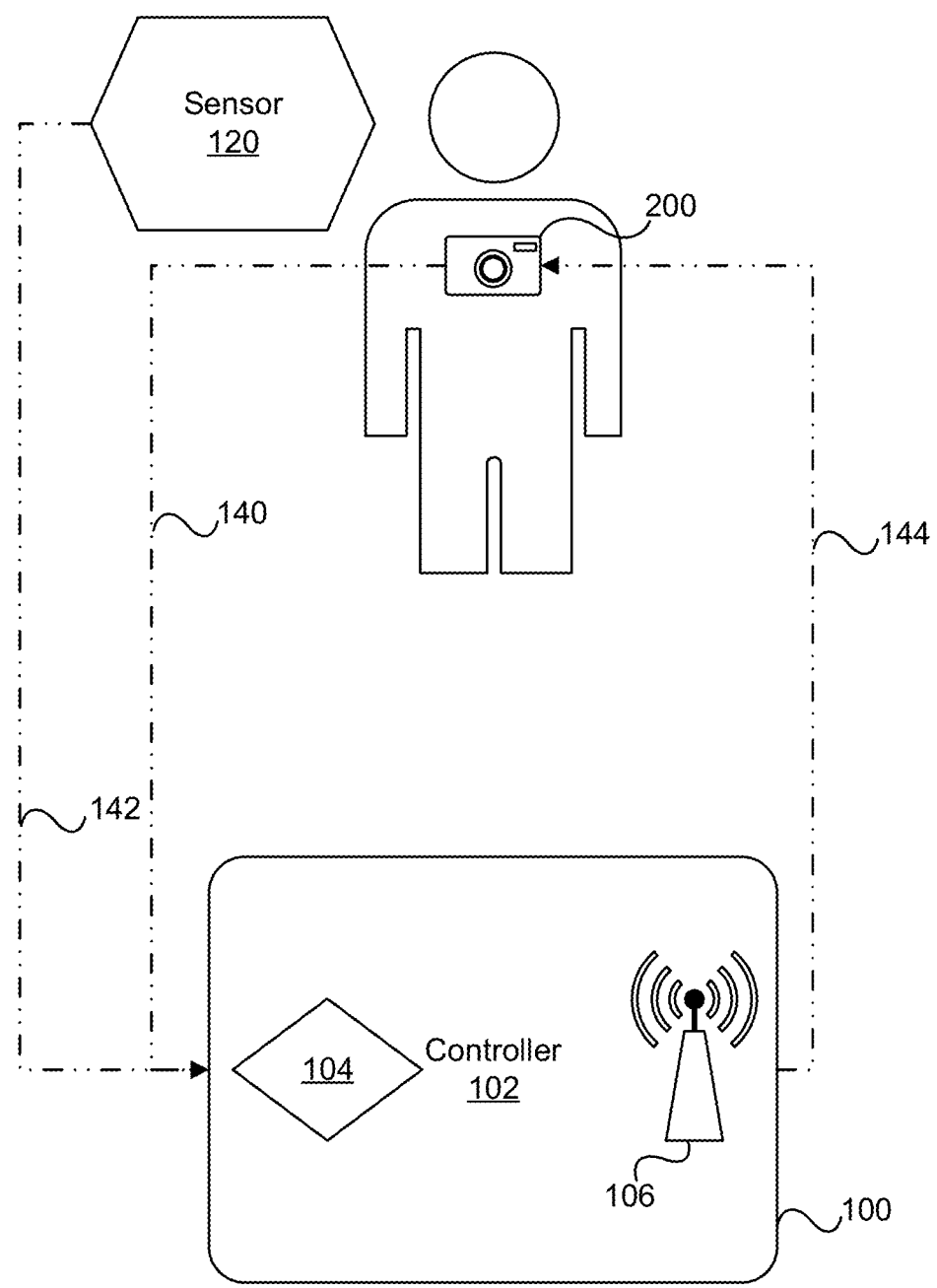
FIG. 2 is a diagram of an exemplary system with a body-worn recording device, according to an embodiment of the present disclosure.

FIG. 2 is a diagram of an exemplary system with a body-worn recording device, according to an embodiment of the present disclosure. Other components shown in FIG. 2, including a sensor 120, a sensor monitoring assembly 100, a controller 102, a receiver 104, a transmitter 106, a first communication signal 140, a second communication signal 142, and a third communication signal 144, have been previously discussed. The actual configuration of the various components can vary depending on the particular application.

The body-worn camera 200, as depicted in FIG. 2, is a specific application of a recording device 130 as previously discussed. The body-worn camera 200 can be any type of body-worn camera as would be appropriate for the application and can be in communication with the sensor monitoring assembly 100 through a wireless or a wired connection. For example, if the body-worn camera 200 is in wireless communication with the sensor monitoring assembly 100, the body-worn camera 200 can be configured to communicate over a Bluetooth™, Bluetooth™ low-energy (BLE), Wi-Fi™, ZigBee™, infrared, radio frequency, or any other appropriate type of wireless communication for the application. In some examples of the present disclosure, body-worn camera 200 is a beacon device in wireless communication with the sensor monitoring assembly 100 and can send a BLE signal. Furthermore, if the body-worn camera 200 is in wired communication with the sensor monitoring assembly 100, it can be configured to send a signal through a USB, HDMI, Ethernet, twisted pair, coaxial, fiber optic, a hard-wired, or any other appropriate form of cable for the application. For example, in some examples of the present disclosure, body-worn camera 200, in wired communication with the sensor monitoring assembly 100, can send a signal via a FT232 USB cable.

Figure 3:
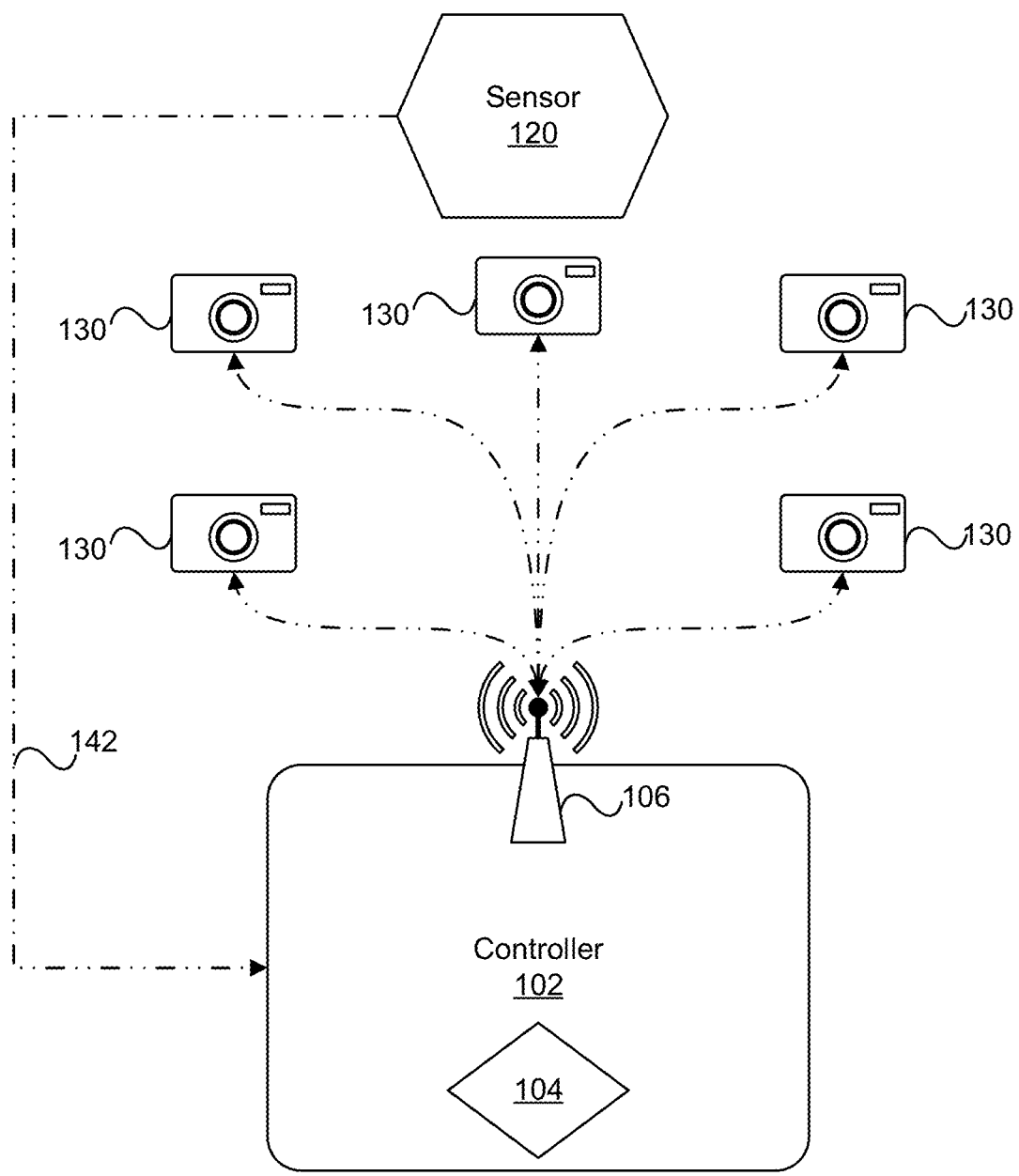
FIG. 3 is a diagram of an exemplary system with multiple recording devices, according to an embodiment of the present disclosure.

FIG. 3 is a diagram of an exemplary system with multiple recording devices 130, according to an embodiment of the present disclosure. In some examples, the sensor monitoring assembly 100 can be configured to communicate simultaneously with multiple recording devices 130. As with the above described examples which connect with only a single recording device, the sensor monitoring assembly in this embodiment only instructs the multiple recording devices 130 to begin recording when it has received a signal from a sensor 120 or when manually instructed to do so. Therefore, the multiple recording devices 130 are all configured to respond to a signal from the sensor monitoring assembly 100 only when a sensor 120 has been actuated or when manually instructed to do so. The sensor 120 can be any form of sensor as previously described. The recording devices 130 can all be the same type of recording device or a combination of several different types of recording devices. For example, in some examples, a sensor monitoring assembly 100 can be connected to multiple recording devices 130 which are all body-worn cameras worn by multiple individuals. Alternatively, in another exemplary embodiment, the sensor monitoring assembly 100 can be connected to multiple recording devices 130 which are different types of recording devices. For example, the multiple recording devices 130 can comprise a combination of a body-worn camera, a vehicle-mounted camera, a temperature sensor, an audio recording device, and an accelerometer. Thus, multiple aspects of a given event can be recorded simultaneously. For example, the just described combination of recording devices would give law enforcement officers multiple sets of data to consider when reviewing an event which occurred while on patrol, such as a vehicle crashing into a police vehicle during a traffic stop.

Figure 4:
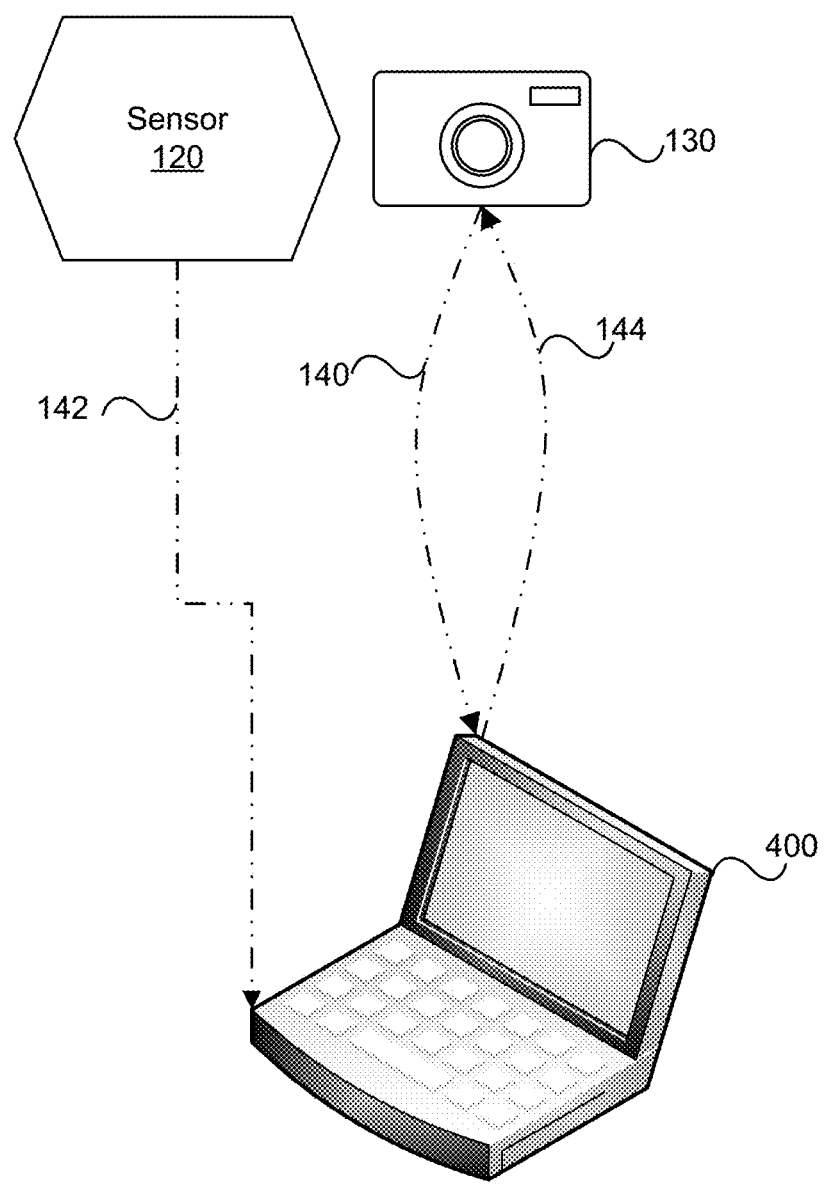
FIG. 4 is a diagram of an exemplary system with a laptop, according to an embodiment of the present disclosure.

FIG. 4 is a diagram of an exemplary system with a laptop, according to an embodiment of the present disclosure. As discussed above, the sensor monitoring assembly 100 can be a laptop 400 configured to function as the sensor monitoring assembly 100. In some examples, the laptop 400 is configured to be in communication with the sensor 120 and the recording device 130 via built-in or add-on wireless and wired connections. For example, the sensor 120 and the recording device 130 can be in communication with the laptop 400 through a USB, a Bluetooth™, or a Wi-Fi™ connection. Furthermore, the laptop 400 can be configured to run a Windows™ program, or any other operating system program, which performs the function of the sensor monitoring assembly 100. The actual configuration of the laptop 400 can be modified for the specific application.

Figure 5:
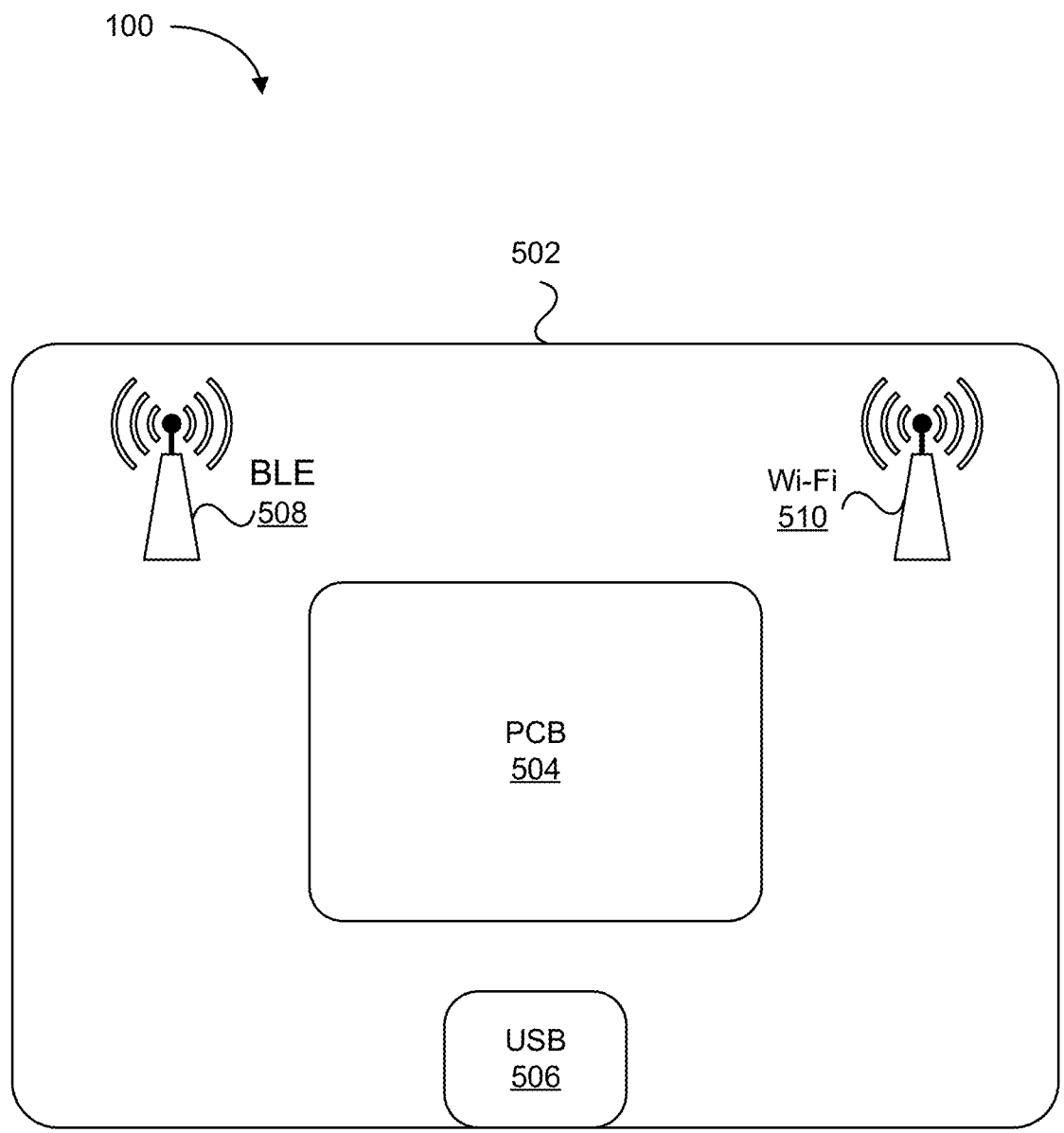
FIG. 5 is a component diagram of an exemplary sensor monitoring assembly, according to the present disclosure.

FIG. 5 is a component diagram of a controller, according to the present disclosure. As depicted in FIG. 5, the sensor monitoring assembly 100 can comprise a housing 502, a PCB 504, a USB connection 506, a BLE connection 508, and a Wi-Fi™ connection 510. These various connections can be both a receiver 104 and a transmitter 106 as would be appropriate for the specific application. The exemplary embodiment depicted in FIG. 5 is shown merely for illustration purposes and the actual configuration may vary depending on the specific application.

Figure 6:
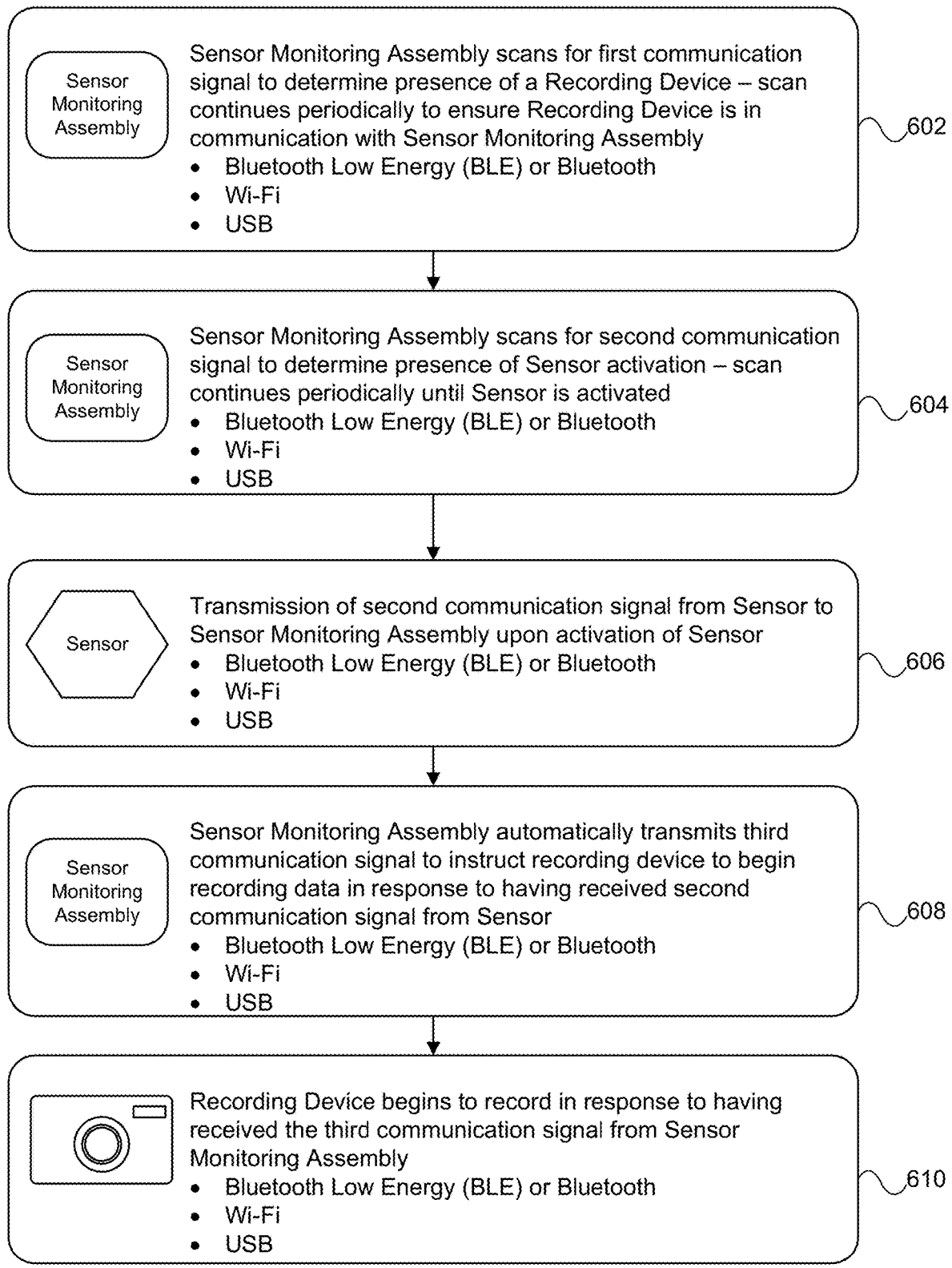
FIG. 6 is a logic diagram of a method of managing an exemplary system, according to an embodiment of the present disclosure.

FIG. 6 is a logic diagram of an exemplary system, according to an embodiment of the present disclosure. In some examples, the sensor monitoring assembly 100 scans 602 for a first communication signal 140 to determine the presence of a recording device 130. The scanning 602 can occur periodically to ensure the recording device 130 remains in communication with the sensor monitoring assembly 100. For example, scanning 602 periodically can include repeatedly determining if the recording device 130 is in communication with the sensor monitoring assembly 100, waiting a predetermined length of time, and once again determining if the recording device 130 is in communication with the sensor monitoring assembly 100. The predetermined length of time can be a few minutes, a few seconds, or multiple times a second. For example, the predetermined length of time between scans can be approximately 5 minutes, 2 minutes, 1 minute, 30 seconds, 15, seconds, 10 seconds, 5 seconds, 2 seconds, 1 second, two times a second, five times a second, ten times a second, fifty times a second, hundreds of times a second, etc., depending on the particular application. The scanning can be for a wireless connection, such as BLE, or Wi-Fi™, or the scanning can be for a wired connection, such as a USB connection. The sensor monitoring assembly 100 then scans 604 for a second communication signal 142 to determine the presence of sensor 120 in an activated state. The scanning 604 can occur periodically or continuously to monitor for a sensor 120 in an activated state. The scanning 604 can be for a wireless connection, such as BLE, or Wi-Fi™, or the scanning 604 can be for a wired connection, such as a USB connection. Once a sensor 120 is in an activated state, the sensor monitoring assembly 100, upon receiving a signal from a sensor 120 in an activated state 606, transmits 608 a third communication signal 144 to a recording device 130. The recording device 130 then begins to record 610 an event of interest. The sequence of events in FIG. 6 is given merely for illustration purposes and the actual sequence performed by the sensor monitoring assembly may vary depending on the specific application.

Figure 7:
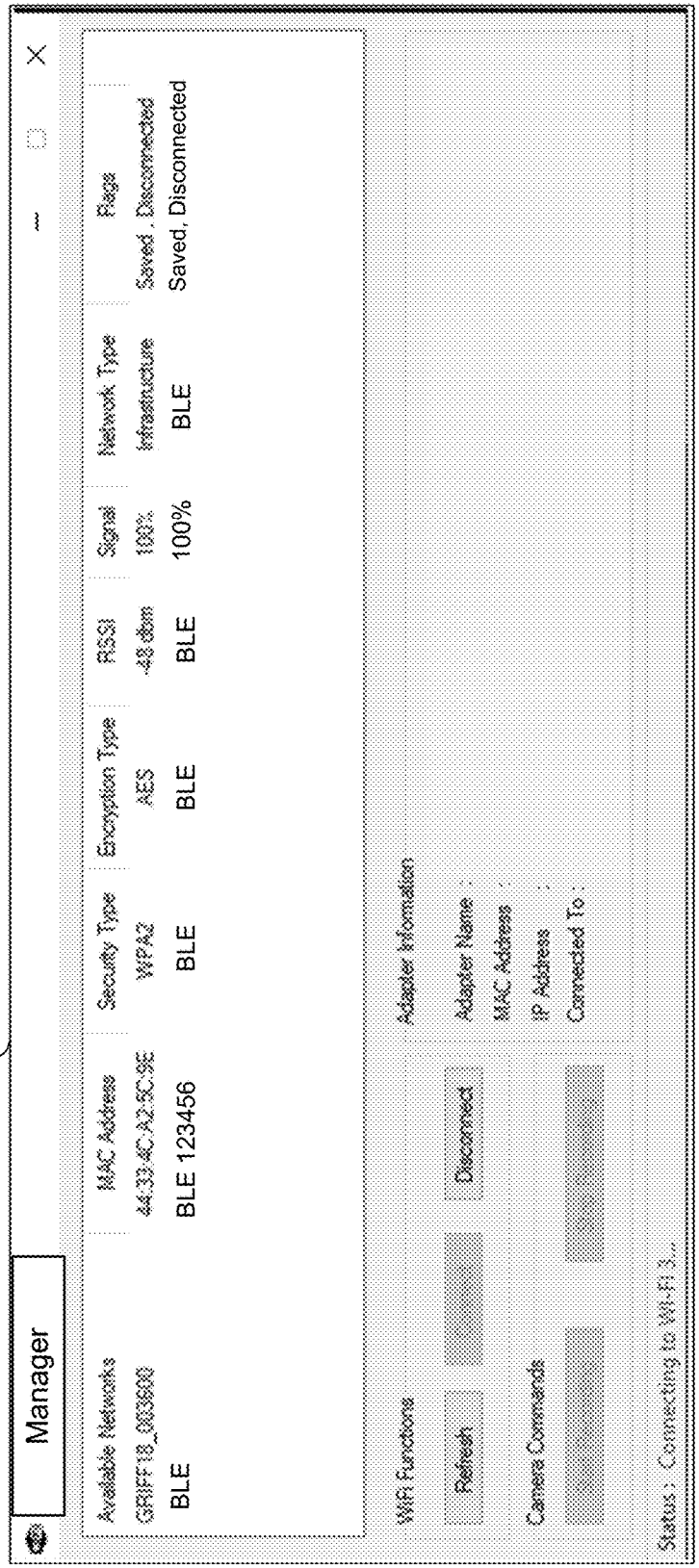
FIG. 7 is a diagram of an example user interface, according to an embodiment of the present disclosure.

FIG. 7 is an example user interface 702 which can be used to manage the sensor monitoring assembly 100 but should not be construed as a limiting example because the user interface 702 can be designed in many different configurations for different applications and user preferences. In particular, the user interface 702 is depicted as being configured to manage a recording device 130 via a Wi-Fi connection and/or BLE connection. The user interface 702 is not so limited and can be applicable to other wired or wireless communication signals, including those wired or wireless communication signals described herein. The user interface 702 can be displayed directly on a built-in screen or remotely on a separate screen and can show which one or more recording devices 130 are available for connection. The user interface 702 can identify the recording device 130 by its wireless network, media access control address (MAC address), or other identifying information which can show which recording devices 130 are available. The user interface 702 can also allow for the user to select which recording device 130 to connect to and include command buttons which allow the sensor monitoring assembly 100 to refresh and continue searching for available recording devices 130, connect to available recording devices 130, and disconnect from a connected recording device 130. The user interface 702 can also include command buttons which instruct the recording device 130 to start and stop recording when a recording device 130 is connected. The user interface 702 can also show the status of a pending action or command as well as adapter information if an adapter is used.

Figure 8:
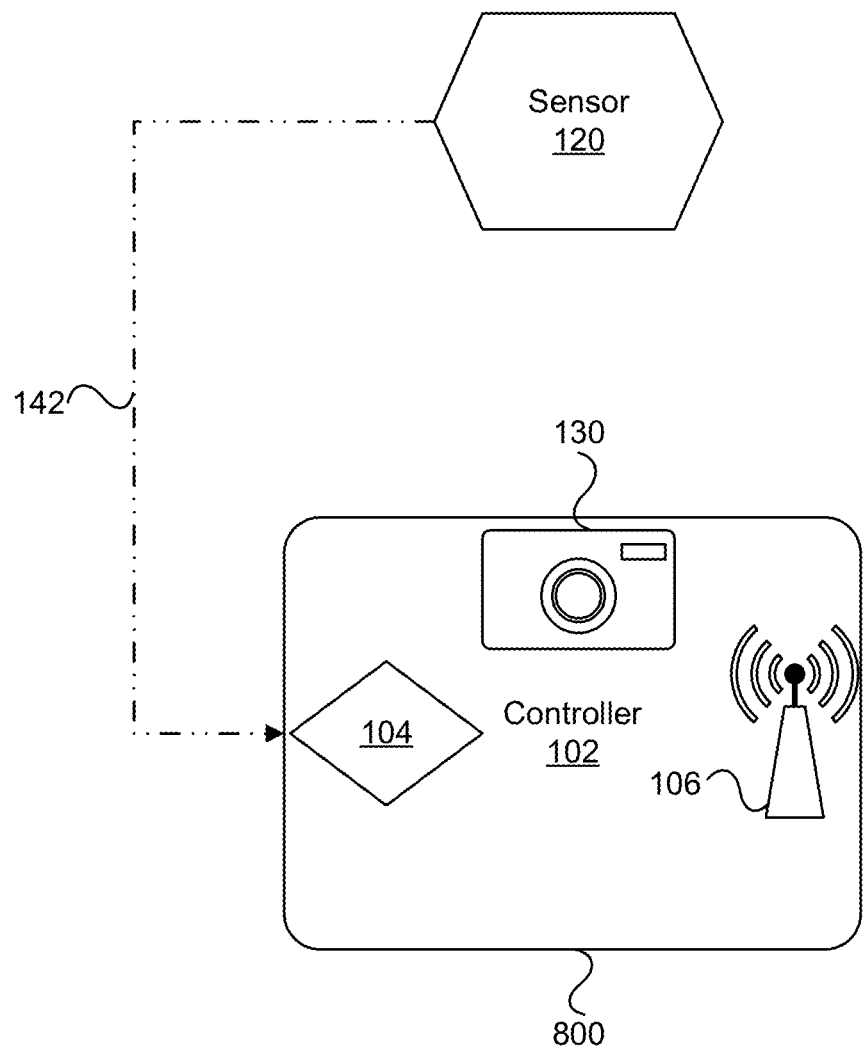
FIG. 8 is a diagram of an exemplary system with a recording device combined with a controller, according to an embodiment of the present disclosure.

FIG. 8 is a diagram of an exemplary system 800 with a recording device 130 combined with a controller 102, according to an embodiment of the present disclosure. As will be appreciated by one of skill in the art, by combining the recording device 130 with the controller 102 to form the recording system 800, the disclosed technology can be a compact device that can be configured to record an event of interest. As depicted in FIG. 8, in some examples the recording device 130 can be combined with the controller 102 to form a recording system 800. The recording system 800 can be in communication with the sensor 120 and can be configured to begin recording once the receiver 104 receives a communication signal from the sensor 120. Furthermore, the recording system 800 can include a transmitter 106 that can be configured to transmit data from the recording system 800. Each of the components depicted in FIG. 8 can be or include the same elements and attributes of like components as previously described herein.

Figure 9:
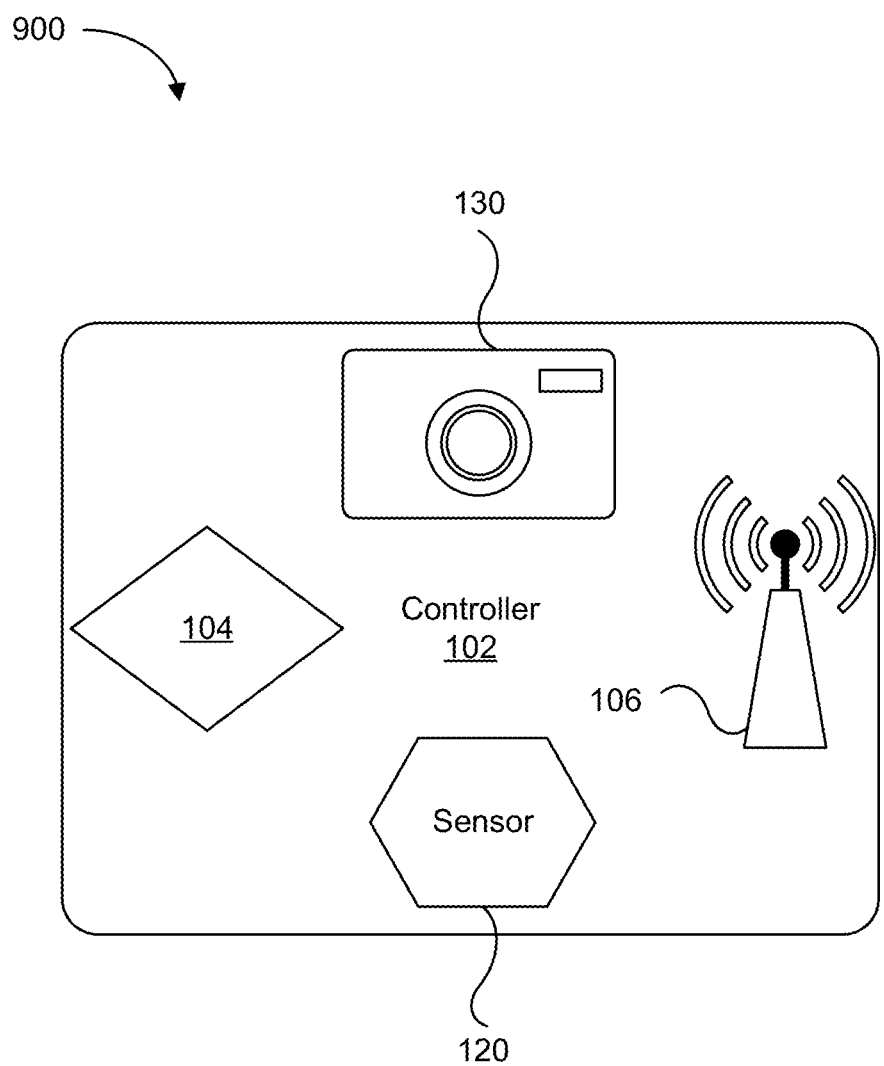
FIG. 9 is a diagram of an exemplary system with a recording device and sensor combined with a controller, according to an embodiment of the present disclosure.

FIG. 9 is a diagram of an exemplary system with a recording device and sensor combined with a controller, according to an embodiment of the present disclosure. As will be appreciated by one of skill in the art, by combining the recording device 130 and the sensor 120 with the controller 102 to form the recording system 900, the disclosed technology can be a compact device that can be configured to record an event of interest. As depicted in FIG. 9, in some examples the recording device 130 and the sensor 120 can both be combined with the controller 102 to form a recording system 900. The recording system 900 can thus be configured to begin recording once the sensor 120 detects an event of interest. Furthermore, the recording system 800 can include a transmitter 106 that can be configured to transmit data from the recording system 800 and a receiver 104 configured to receive data from a device in communication with the recording system 900. Each of the components depicted in FIG. 9 can be or include the same elements and attributes of like components as previously described herein.

In some examples, the sensor 120 of the recording system 900 can be a global positioning system (GPS) sensor that can be used to determine a location of the recording system 900 and, based on the speed of the recording system 900 as indicated by the GPS signal (e.g., falling down, driving, running, or otherwise moving, etc.), the controller 102 can determine that an event of interest should be recorded and output a signal to the recording device 130 to begin recording.

The definitions of the words or elements of the following claims are, therefore, defined in this specification to not only include the combination of elements which are literally set forth. It is also contemplated that an equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sensor monitoring assembly for use with a recording device, the sensor monitoring assembly comprising:
   a controller;
   a receiver in communication with the controller and operable to receive a first communication signal from a sensor, the sensor being configured to transmit the first communication signal in response to detecting an event of interest; and
   a transmitter in communication with the controller and operable to transmit a second communication signal to a recording device to cause the recording device to begin recording data,
   wherein the controller is configured to cause the transmitter to transmit the second communication signal to the recording device in response to the receiver having received the first communication signal; and
   wherein the controller is contained in a computer comprising:
      a housing:
      a printed circuit board (PCB) contained in the housing;
      an FT232 USB connector contained in the housing and in communication with the PCB;
      a Bluetooth Low Energy (BLE) module contained in the housing and in communication with the PCB; and
      a wireless communication module contained in the housing and in communication with the PCB.

2. The sensor monitoring assembly of claim 1, wherein the controller is further configured to:
   periodically scan, with the receiver, for the first communication signal to determine presence of the sensor in an activated state within an operating range of the sensor monitoring assembly; and
   periodically scan, with the receiver, for a third communication signal from the recording device to determine presence of the recording device within an operating range of the sensor monitoring assembly.

3. The sensor monitoring assembly of claim 2, wherein the controller is further configured to periodically scan for the first communication signal at least every three seconds.

4. The sensor monitoring assembly of claim 2, wherein the controller is configured to periodically scan for the third communication signal at least every thirty seconds.

5. The sensor monitoring assembly of claim 2, wherein the controller is further configured to:
in response to determining that a connection between the recording device and the sensor monitoring assembly is interrupted, periodically transmit, with the transmitter over a predetermined time interval, a fourth communication signal to reestablish a connection between the recording device and the sensor monitoring assembly.

6. The sensor monitoring assembly of claim 1, wherein the controller is further configured to:
periodically scan, with the receiver, for a predetermined Bluetooth Low Energy (BLE) beacon associated with the recording device; and
in response to detecting a presence of the predetermined BLE beacon, link the recording device with the sensor monitoring assembly.

7. The sensor monitoring assembly of claim 1, wherein the controller is further configured to:
monitor for predetermined voltage activity associated with the recording device; and
upon detecting the predetermined voltage activity, link the recording device with the sensor monitoring assembly.

8. The sensor monitoring assembly of claim 1, wherein the controller is further configured to:
register an identifier of the recording device into a local sensor database file; and
record a log of events associated with the sensor and the recording device.

9. The sensor monitoring assembly of claim 1, wherein the event of interest comprises at least one of door movement, window movement, a garage door opening, movement of a mailbox, activation of a siren, disconnection of the recording device from a connector or mount, disconnection of the recording device from an officer, turning off a vehicle, turning on the vehicle, movement of a vehicle trunk, a sudden change in movement, and a sudden change in sound.

10. The sensor monitoring assembly of claim 1, wherein the recording device is a single recording device configured for wear by a police officer, the recording device being a body camera.

11. The sensor monitoring assembly of claim 1, wherein the sensor monitoring assembly is configured to communicate with multiple recording devices simultaneously.

12. The sensor monitoring assembly of claim 1, wherein the recording device is configured to operatively communicate with the sensor monitoring assembly within a predetermined range.

13. The sensor monitoring assembly of claim 12, wherein the predetermined range is approximately 200 feet.

14. The sensor monitoring assembly of claim 12, wherein the predetermined range is approximately 25 feet.

15. The sensor monitoring assembly of claim 1, wherein the recording device is a camera worn by an individual.

16. The sensor monitoring assembly of claim 1, wherein the recording device is a camera mounted on a vehicle.

17. The sensor monitoring assembly of claim 1, wherein the recording device is an internet service with a receiving application programming interface.

18. The sensor monitoring assembly of claim 1, wherein the sensor monitoring assembly communicates only with a recording device having a predetermined service set identifier.

19. A method of automatically managing a recording device to record data, the method comprising:
scanning, by a sensor monitoring assembly, for a first communication signal to determine presence of a recording device within an operating range of the sensor monitoring assembly;
scanning, by a sensor monitoring assembly, for a second communication signal to determine presence of a sensor in an activated state within an operating range of the sensor monitoring assembly;
transmitting, by a sensor monitoring assembly, a third communication signal to instruct the recording device to begin recording data,
wherein the sensor monitoring assembly automatically transmits the third communication signal in response to having received a second communication signal from the sensor; and
wherein the sensor monitoring assembly is contained in a computer comprising:
a housing:
a printed circuit board (PCB) contained in the housing;
an FT232 USB connector contained in the housing and in communication with the PCB;
a Bluetooth Low Energy (BLE) module contained in the housing and in communication with the PCB; and
a wireless communication module contained in the housing and in communication with the PCB.

* * * * *